United States Patent
Bender et al.

(10) Patent No.: US 10,128,549 B2
(45) Date of Patent: Nov. 13, 2018

(54) ELECTRICAL ENERGY STORE

(71) Applicant: Dr. Ing. h.c. F. Porsche Aktiengesellschaft, Stuttgart (DE)

(72) Inventors: Stefan Bender, Ludwigsburg (DE); Bjoern Pehnert, Tamm (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/100,828

(22) Filed: Dec. 9, 2013

(65) Prior Publication Data
US 2014/0170462 A1   Jun. 19, 2014

(30) Foreign Application Priority Data

Dec. 14, 2012 (DE) .................. 10 2012 112 294

(51) Int. Cl.
| | |
|---|---|
| *H01M 10/625* | (2014.01) |
| *H01M 10/647* | (2014.01) |
| *H01M 10/6555* | (2014.01) |
| *H01M 10/6556* | (2014.01) |
| *H01M 10/613* | (2014.01) |

(52) U.S. Cl.
CPC ....... *H01M 10/625* (2015.04); *H01M 10/613* (2015.04); *H01M 10/647* (2015.04); *H01M 10/6555* (2015.04); *H01M 10/6556* (2015.04)

(58) Field of Classification Search
CPC ..................... H01M 10/60–10/667
See application file for complete search history.

(56) References Cited

U.S. PATENT DOCUMENTS

| | | | | |
|---|---|---|---|---|
| 3,655,452 | A * | 4/1972 | Cich ..................... | H01M 6/42 429/159 |
| 5,660,587 | A * | 8/1997 | Baer ........................... | 454/237 |
| 5,756,227 | A * | 5/1998 | Suzuki et al. .............. | 429/62 |
| 8,404,375 | B2 | 3/2013 | Gaben | |
| 2006/0134514 | A1 | 6/2006 | Lenain et al. | |
| 2007/0228339 | A1* | 10/2007 | Fujiwara et al. .......... | 252/511 |
| 2009/0087727 | A1* | 4/2009 | Harada ............. | H01M 2/1077 429/120 |
| 2009/0142653 | A1* | 6/2009 | Okada ............. | H01M 2/1077 429/120 |
| 2010/0247997 | A1* | 9/2010 | Hostler et al. .......... | 429/120 |
| 2010/0279152 | A1 | 11/2010 | Payne | |

(Continued)

FOREIGN PATENT DOCUMENTS

| | | |
|---|---|---|
| DE | 10 2009 040 147 | 3/2011 |
| DE | 20 2010 016 259 | 3/2011 |

(Continued)

OTHER PUBLICATIONS

Machine translation of Hohenthanner et al. (DE 10 2010 050 993) (Oct. 2012).*

(Continued)

*Primary Examiner* — Jonathan Crepeau
*Assistant Examiner* — Jacob Buchanan
(74) *Attorney, Agent, or Firm* — Gerald E. Hespops; Michael J. Porco; Matthew T. Hespos

(57) ABSTRACT

An electrical energy store for a motor vehicle has multiple battery cells oriented in the same direction. Each battery cell has two parallel sides and a cell terminal with one plus pole and one minus pole. The battery cells are in the form of pouch cells between which there is arranged a cooling foil that comprises graphite particles and a cooling duct connected in heat-transmitting fashion to the cell terminal and to the foil.

7 Claims, 2 Drawing Sheets

(56) References Cited

U.S. PATENT DOCUMENTS

| | | |
|---|---|---|
| 2011/0003185 A1 | 1/2011 | Kritzer |
| 2011/0059347 A1 | 3/2011 | Lee et al. |
| 2011/0195290 A1 | 8/2011 | Koenigsmann |
| 2012/0009455 A1* | 1/2012 | Yoon .................. H01M 10/653 429/120 |
| 2012/0088140 A1* | 4/2012 | Kardasz ................. H01M 4/13 429/120 |
| 2012/0231315 A1 | 9/2012 | Yoon |
| 2012/0282506 A1 | 11/2012 | Hohenthanner et al. |
| 2012/0301771 A1* | 11/2012 | Moser et al. .................. 429/120 |
| 2013/0266838 A1 | 10/2013 | Von Borck et al. |

FOREIGN PATENT DOCUMENTS

| | | | |
|---|---|---|---|
| DE | 10 2010 050 993 | 5/2012 | |
| EP | 2 355 204 | 8/2011 | |
| JP | 2002088249 | 3/2002 | |
| JP | 2004071178 | 3/2004 | |
| JP | 2005163545 | 6/2005 | |
| JP | 2009032852 | 2/2009 | |
| JP | 2010118239 | 5/2010 | |
| WO | WO 2011054952 A1 * | 5/2011 | ............ H01M 10/50 |
| WO | 2011/146919 | 11/2011 | |
| WO | 2012/013789 | 2/2012 | |

OTHER PUBLICATIONS

German Search Report dated Aug. 30, 2013.
Japanese Patent Appl. No. 2013-251739—Offie Action dated Jan. 14, 2015.

* cited by examiner

ELECTRICAL ENERGY STORE

CROSS REFERENCE TO RELATED APPLICATION

This application claims priority under 35 USC 119 to German Patent Appl. No. 10 2012 112 294.6 filed on Dec. 14, 2012, the entire disclosure of which is incorporated herein by reference.

BACKGROUND

1. Field of the Invention

The invention relates to an electrical energy store having multiple battery cells oriented in the same direction. The invention also relates to a motor vehicle equipped with an electrical energy store of said type.

2. Description of the Related Art

US 2006/0134514 A1 discloses a generic electrical energy store having multiple battery cells oriented in the same direction. Each battery cell has two parallel sides and a cell terminal with one plus pole and one minus pole. Graphite cooling bodies are arranged between the battery cells for transmitting heat.

EP 2 355 204 A1 discloses a battery unit with first and second battery stacks, each of which has multiple battery modules. Each battery module accommodates one or more battery cells. The battery modules of the first battery stack define a first battery stack side and the battery modules of the second battery stack define a second battery stack side that is spaced apart from and opposite the first battery stack side. A heat exchanger structure is arranged between the two battery stacks and has fluid flow passages. The heat exchanger structure is elastically deformable and can be compressed in the event of expansion of the first and second battery stacks.

US 2011/0195290 A1 discloses a battery module having a housing and at least two batteries arranged therein. A cooling element is between the batteries for dissipating the heat generated by the batteries. The cooling element has a greater extent in an x-axis direction and in a y-axis direction than in a z-axis direction. The cooling element exhibits greater thermal conductivity in the x-axis and/or y-axis direction than in the z-axis direction. Thus, a directed dissipation of heat can be forced.

US 2010/0279152 A1 discloses a battery module having multiple battery cells, and a graphite heat-conducting body is arranged between the battery cells.

US 2012/0009455 A1 discloses a battery module having interconnected battery cells arranged parallel to one another. The battery cells are separated from one another by cooling bodies. A similar energy store is described in WO 2012/013789 A1.

Further electrical energy stores are known from US 2012/0231315 A1 and from WO 2011/146919 A2.

Modern high-performance batteries, in particular traction batteries in hybrid or electric vehicles, must be cooled to be able to obtain good performance and to lengthen their service life. The known electrical energy stores normally are assembled from individual battery cells arranged adjacent one another in a stacked manner. Cooling bodies often are arranged between the battery cells to achieve efficient cooling of the battery cells. However, the cooling bodies require a significant amount of structural space and cannot optimally cool critical regions of the individual battery cells.

The invention is concerned with improved cooling an electrical energy store and achieving a compact design.

SUMMARY OF THE INVENTION

The invention relates to an electrical energy store having multiple battery cells oriented in the same direction and in the form of pouch cells. The pouch cells are cooled by foils that comprise graphite and that are arranged between the individual pouch cells. Additionally, a respective cell terminal of the battery cell is connected in heat-transmitting fashion to a cooling duct. Thus, the individual battery cells are cooled over a large area on their outer sides and simultaneously the regions of the cell terminals of the battery cells are cooled. The pouch cells are relatively simple to produce and do not require a housing, thereby saving structural space and weight. The individual foils that comprise graphite between the pouch cells can be very compact and enable structural space reductions as compared to other cooling options. The cooling foils also adapt in an optimum manner to the respective surface of the pouch cell and achieve areal abutment that permits an optimized dissipation of heat, and good temperature homogeneity as a result of the heat spreader effect. The cooling duct advantageously is connected in heat-transmitting fashion to the cell terminal and simultaneously to the foil. Thus, the respective battery cells can be cooled over a large area on their side surfaces and also in an optimized manner in the region of the cell terminal.

The foil expediently is formed as a plastics foil with graphite particles. In this way, the foil for cooling of the battery cells can be produced relatively inexpensively. The graphite particles may be surrounded by the plastic of the foil.

The foil covers and cools the respective sides of the adjacent pouch cells and also may cool the respective cell terminal. For example, the foil may have projections in the direction of the respective cell terminal. Thus, the terminal is cooled by direct contact with the cooling duct and also by direct contact with the projection of the foil.

The invention also relates to hybrid or electric vehicle with the above-described energy store as a traction battery. The effective cooling and the compact design of the energy store can considerably enhance the performance of a hybrid or electric vehicle because a higher number of energy stores can be arranged in the same space.

Further important features and advantages of the invention will emerge from the drawings and from the associated description.

The features specified above and those explained below may be used in the specified combination and in other combinations or individually without departing from the scope of the invention.

Preferred embodiments of the invention are illustrated in the drawings and will be explained in more detail in the following description, wherein identical or similar or functionally identical components are denoted by the same reference signs.

DETAILED DESCRIPTION OF THE PREFERRED EMBODIMENTS

Figure 1:
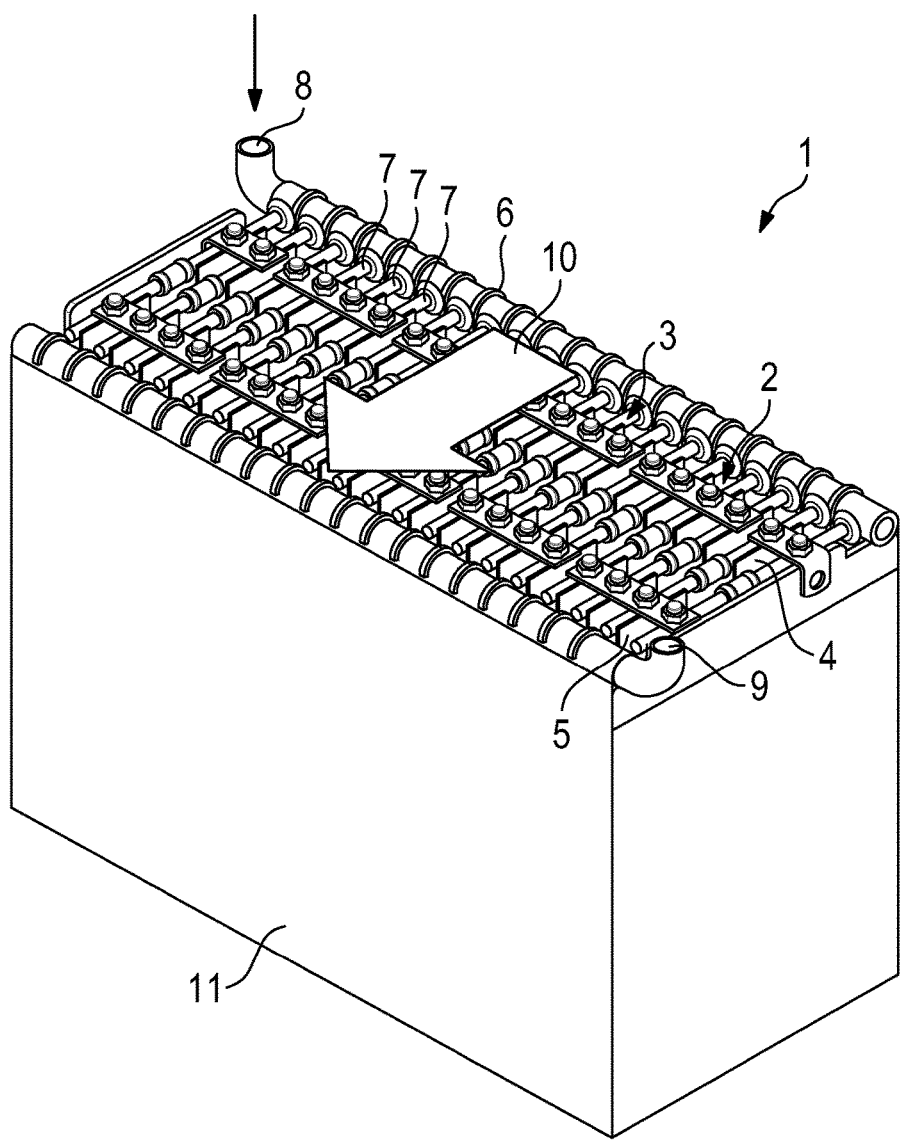
FIG. 1 is a side view of an electrical energy store according to the invention.
Figure 2:
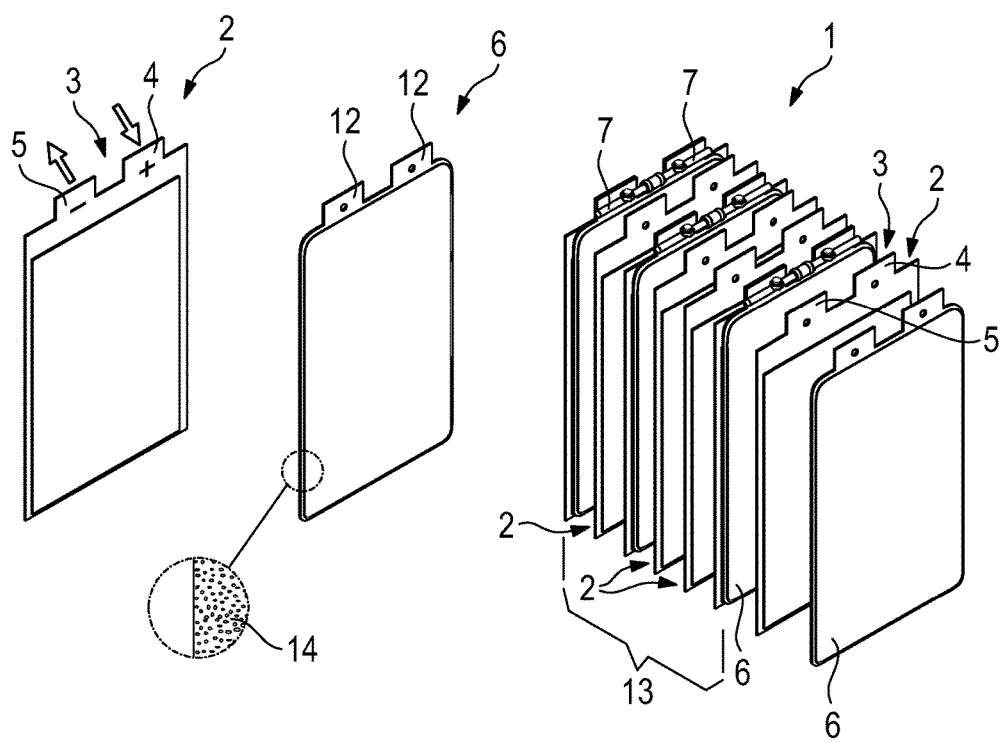
FIG. 2 is an exploded illustration of an electrical energy store.

As shown in FIGS. 1 and 2, an electrical energy store 1 according to the invention has multiple battery cells 2 that are oriented in the same direction. Each battery cell 2 has two parallel sides. Furthermore, each battery cell 2 has a cell terminal 3 with one plus pole 4 and one minus pole 5 (cf. FIG. 2). The battery cells 2 are pouch cells and a cooling foil 6 that comprises graphite particles 14 is arranged between adjacent battery cells 2 for cooling the battery cells 2. Graphite exhibits high thermal conductivity. Thus, the foil 6 is capable of dissipating, over a large area of the side surfaces of the battery cell 2, the heat that is generated in the interior of the battery cell 2 during the operation thereof. Furthermore, a cooling duct 7 is provided in heat-transmitting fashion in the region of at least one cell terminal 3 and also in heat-transmitting fashion to the foil 6. The electrical energy store 1 has numerous significant advantages due to the described design. First, the foil 6 achieves cooling of the individual battery cells over a large area, but nevertheless reduces structural space. Thus, the performance of the energy store 1 can be increased, and the structural space requirement thereof reduced. As a result of the direct heat-transmitting connection of the cooling ducts 7 to the respective cell terminal 3, it also is possible to realize cooling of the battery cell 2 over a large area on the sides but also efficient cooling of the cell terminal 3, so that cooling can take place both from the inside and from the outside. The use of pouch cells as battery cells 2 avoids the need for a housing to enclose each battery cell, thereby reducing space and cost. Pouch cells are just as powerful as battery cells enclosed by a housing, but are considerably less expensive.

The foil 6 for the cooling of the individual battery cells 2 is formed as a plastics foil with graphite particles 14 enclosed or embedded therein. The formation of the foil 6 as a plastics foil enables the foil 6 to be produced in an inexpensive and flexible manner so that with corresponding injection-molding tools, it is generally possible to react to a wide variety of dimensions and/or changes in dimensions. Furthermore, the foil 6 preferably is designed to bear areally against the respective side of the adjacent battery cell 2, and also the respective battery terminal 3.

At least two adjacent battery cells 2 that are separated from one another by a foil 6 may form a battery module 13 with a common cell terminal 3. In this case, the individual battery cells 2 would have to be connected electrically to one another. Several such battery modules 13 could then be arranged adjacent to one another in a stacked manner in the energy store 1, and, in each case, one additional foil 6 would be arranged between the battery modules 13.

The cooling ducts 7 preferably have an angular external cross section and a circular internal cross section. The angular or rectangular external cross section permits areal abutment against the respective cell terminal 3, whereas the circular internal cross section is of optimized design in terms of flow. FIG. 1 shows that the coolant flowing through the cooling ducts 7 flows first via an inlet duct 8, wherein the respective cooling ducts 7 are, at their respective longitudinal ends, connected at the inlet side to the inlet duct 8 and at the outlet side to an opposite outlet duct 9. The cooling fluid thus flows through the cooling ducts 7 correspondingly to the arrow 10, and in so doing cools the individual cell terminals 3 of the respective battery cells 2 and also the foils 6, which in turn are connected in heat-transmitting fashion in individual battery cells 2. The energy store 1 according to the invention is enclosed by a housing 11 that holds the individual battery cells 2 together.

The middle illustration of FIG. 2 illustrates that the foil 6, due to its flexibility, can bear areally against the respective battery cell 2, and has, in the region of the cell terminal 3, projections 12 connected in heat-transmitting fashion to the cooling ducts 7.

The energy store 1 of invention may be used in all motor vehicles, but is particularly advantageous in hybrid or electric vehicles that have a high electrical energy requirement. The electrical energy store 1 combines two hitherto independent cooling concepts, specifically the cooling of the cell terminal 3 and the areal cooling of the battery cells 2 so that performance can be increased. The provision of battery cells 2 as pouch cells and the cooling body as a foil 6 enables the electrical energy store 1 to be considerably more compact than previous energy stores, and therefore yields considerable advantages in terms of weight and performance.

What is claimed is:

1. An electrical energy store for a motor vehicle, comprising:

a plurality of pouch battery cells arranged substantially parallel to one another, each of the pouch battery cells having first and second opposite parallel surfaces and opposite first and second sides extending between the first and second surfaces, and a cell terminal end extending between the first and second surfaces and between the first and second sides, a first pole and a second pole projecting from the cell terminal end of each of the pouch battery cells at positions spaced from one another and at positions spaced inward from the first and second sides respectively, electrically insulating flexible foil sheets formed from plastic with heat-conducting graphite particles therein, the foil sheets being arranged between adjacent pouch battery cells of the plurality of pouch battery cells and each of the foil sheets having:

opposite first and second surfaces in surface-to-surface areal contact with one of the first and second opposite surfaces of each of the adjacent pouch battery cells, opposite first and second sides extending between the first and second surfaces of the respective foil sheet and substantially registered respectively with the first and second sides of the pouch battery cell adjacent thereto, an edge substantially aligned with the cell terminal ends of each of the adjacent pouch battery cells, and first and second projections projecting from the edge at positions aligned respectively with the first and second poles of the adjacent pouch battery cells so that the projections align with the poles in an alignment direction, and an inlet duct adjacent the terminal ends of the pouch battery cells and extending linearly in the alignment direction at positions entirely between the first poles and the first sides thereof, an outlet duct adjacent the terminal ends of the pouch battery cells and extending linearly in the alignment direction at positions entirely between the second poles and the second sides thereof and cooling ducts extending between the inlet and outlet ducts at positions respectively between the terminal ends of the adjacent pouch battery cells, the cooling ducts carrying a cooling fluid between the inlet duct and the outlet duct and being connected in heat-transmitting fashion to the cell terminals and to the first and second projections of the foil sheets;

wherein the foil sheets conduct heat from both the surface of the adjacent pouch battery cells and from the first and second poles and wherein the cooling ducts conduct heat from both the projections of the foil sheets and the cell terminals.

2. The electrical energy store of claim 1 comprising at least two battery modules, wherein each of the battery modules includes two of the battery cells separated from one another by a foil sheet, the battery module having a common cell terminal.

3. The electrical energy store of claim 2, wherein one additional foil sheet is arranged between the two battery modules.

4. The electrical energy store of claim 1, wherein each of the cooling ducts has a rectangular external cross section and a circular internal cross section, the rectangular external cross-section defining external surfaces for achieving areal abutment with the adjacent cell terminals, and the circular internal cross-section achieving optimum flow of the cooling fluid.

5. The electrical energy store of claim 1, wherein the electrical energy store is a traction battery in a hybrid or electric vehicle.

6. A hybrid or electric vehicle having the electric energy store of claim 1.

7. The electric energy store of claim 1, wherein the graphite particles are surrounded by the plastic of the foil sheets.

* * * * *